United States Patent Office 3,441,142
Patented Apr. 29, 1969

3,441,142
NONTHROMBOGENIC PLASTIC MEMBRANES
Phyllis D. Oja, San Francisco, Calif., assignor to The Dow Chemical Company, Midland, Mich., a corporation of Delaware
No Drawing. Filed July 21, 1966, Ser. No. 566,720
Int. Cl. C02b 1/82; B01d 13/04, 13/00
U.S. Cl. 210—321                     14 Claims

ABSTRACT OF THE DISCLOSURE

Non-thrombogenic, permeable membranes are prepared from film forming materials having hydroxyl groups, such as cellulose, by converting at least a portion of the hydroxyl groups to oxy alkali metal groups, then reacting with a haloalkyl dialkyl amine, then quaternizing by reacting with an alkyl halide and subsequently reacting with an alkali metal salt of an anti-thrombogenic compound such as sodium heparin. The invention also contemplates materials which can be readily converted to provide hydroxyl groups such as cellulose esters which can then be deacetylated to provide hydroxyl groups.

---

The present invention relates to materials suitable in use as substitutes for natural organs in animal bodies or in other operations wherein plastic materials may be used in the treatment of animal blood. In particular, the present invention relates to permeable membranes especially adapted for use as artificial kidneys and the like.

There has been increased activity and utility in the use of artificial membranes and organs fabricated from man-made plastics. Considerable success has been achieved with these plastics membranes, however, most all plastic materials induce blood clotting when in contact with animal blood. One method that has been used for treating plastic materials to render them nonthrombogenic or at least having the ability to inhibit thrombogenicity involves applying to the surface of the plastic a colloidal layer of graphite. This material is then treated with benzalkonium chloride and finally with heparin. The presence of the heparin on the surface of the plastic material serves to inhibit blood clotting for extended periods of time and affords the utility of plastic materials in the substitution of animal organs and treatment of blood. One difficulty that has been encountered in this method is that it is restricted to rigid plastic articles or organs and thus far has not been efficiently utilized with flexible or elastomeric membranes since the colloidal graphite surface tends to flake off with any amount of flexing thus exposing the plastic surface and again inducing blood clotting. Additionally, even with rigid articles the colloidal graphite surface tends to be abraded or worn off over a period of time.

Another method has been proposed for rendering flexible and elastomeric surfaces nonthrombogenic. This method involves the chemical attachment of the heparin to the polymer surface by complexing the negative sulfate group of the heparin to a positive group such as a quaternary ammonium group that has been grafted to the surface of the polymer. For example, when a polystyrene material is utilized, the surface is first chloromethylated with chloromethyl ether and aluminum chloride. The chloromethyl groups attached to the polystyrene molecules are then reacted with tertiary amines to provide the quaternary ammonium sites needed to chemically unite or bond with the negative sulfate groups of the heparin molecule, heparin being a naturally occurring sulfated polysaccharide.

When a permeable membrane is required for use in an artificial kidney and which will therefore be in contact with animal blood and particularly human blood, it is, of course, essential that the membrane be nonthrombogenic and at the same time have high permeation properties. When permeable membranes are to be treated for the purpose of rendering them nonthrombogenic it is very essential that the permeability properties of the membrane not be degraded or destroyed. Films or membranes of regenerated cellulose are permeable to urea and salts as well as water but, as with other plastic materials, regenerated cellulose will induce blood clotting. On the other hand, several other plastic materials may be only permeable to water but not to such materials as salts and other relatively low molecular weight materials. It would be of advantage to be able to provide permeable membranes which are not only nonthrombogenic but also are highly permeable to water and such materials as urea and salts for use particularly in artificial kidneys.

Several designs have been developed for artificial kidneys such as flat membranes and hollow tubes. More recently developed are the hollow fibers membranes as described in U.S. 3,228,876 and 3,228,877. These structures afford an extremely large dialyzing surface in a relatively small volume of space.

The present invention resides in the finding of a means to effectively make plastic materials nonthrombogenic or at least inhibiting thrombogenicity for extended periods of time. In particular, the present invention resides in the finding of a means to provide permeable membranes that are nonthrombogenic coupled with the characteristic of having high permeability properties. Thus, the present invention resides in the method for inhibiting thrombogenicity in a film-forming polymeric material having dialkylaminoalkyl groups attached to the polymer chains through ether linkages comprising (a) reacting the polymeric material with an alkyl halide followed by (b) reacting the material of (a) with an alkali metal salt of a anionic group-containing antithrombogenic compound (such as heparin or a heparinoid compound). Also within the scope of the present invention is the method for inhibiting thrombogenicity in a hydroxyl group-containing film-forming polymeric material comprising (a) converting at least a portion of the hydroxyl groups of the polymeric material to oxy alkali metal groups; (b) reacting the polymeric material thus treated with a haloalkyl dialkyl amine; (c) reacting the polymeric material with an alkyl halide; and (d) subsequently reacting the polymeric material with an alkali metal salt of a anionic group-containing antithrombogenic compound (such as heparin or a heparinoid compound).

When treating plastic materials that do not initially contain a hydroxyl group in the polymeric structure according to the present invention, these materials can be first treated to induce or create hydroxyl groups in the polymer structure. For example, if the material is a cellulose ester, the cellulose ester is initially treated with an aqueous solution of an excess of the amount of alkali required to de-esterify the cellulose ester to reduce it to a cellulose structure. By this means the ester group is removed substantially from the polymer and in its place hydroxyl groups are substituted which can be treated as described before in order to chemically unite heparin to the surface of the polymer or plastic article.

As indicated, where permeable membranes are desired, it is essential that the permeability or selective permeation of the membrane be maintained during the heparinizing treatment. Thus, in the case of cellulose esters, e.g., cellulose acetate or triacetates, it has been found to be highly beneficial to create the desired permeability of the polymer or membrane during the initial deacetylation step and to maintain it throughout the subsequent steps required to render the membrane nonthrombogenic. An important feature in this connection, and within the scope of the present invention, is to de-esterify the cellulose ester with an aqueous solution of a mixture of a water soluble swelling agent for the cellulose ester and an excess of the amount of alkali required to de-esterify the cellulose ester. Membranes having excellent permeation properties are provided by this means, which are especially well adapted for artificial kidney use.

As indicated, film-forming materials having attached to the polymer chains or polymer molecules through ether linkages a plurality of dialkylaminoalkyl groups are treated according to the present invention. Structurally, these can be represented as follows:

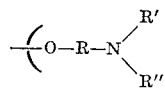

wherein R, R' and R" are alkyl radicals, and generally, the sum of the carbon atoms in R, R' and R" is from 3 to about 10. For example, such polymers that can be employed are diethylaminoethyl cellulose, diethylaminomethyl cellulose, dimethylaminoethyl cellulose and the like.

When the polymeric material does not contain the amino group, then a hydroxyl group-containing polymeric material can be employed. Thus, regenerated cellulose is one of the materials that can be advantageously treated in accordance with the present invention. Additionally, other polymeric materials and membranes thereof that can be so treated or converted so as to have in the polymeric chain a hydroxyl group can also be beneficially employed in the practice of the invention. For example, other polymers that readily bear accessible hydroxyl groups and can be employed are polyvinyl alcohol, hydroxy ethyl cellulose, hydroxyethylcarboxymethyl cellulose, etc. Additionally, materials that have grafted upon their surface hydroxy containing materials may also be employed, for example, hydroxy terminated grafts of alkylene oxides on nylons or polyamides and polyesters. Other materials, as has been mentioned, that can be adapted to treatment according to the present invention are the film-forming cellulose esters including cellulose mono-, di-, and triacetates, cellulose propionate, cellulose butyrate, cellulose acetate propionate, cellulose butyrate, etc. and mixtures thereof.

In many instances it is beneficial to be able to fabricate a membrane from a molten mass of the polymer, particularly when fine hollow fibers are desired for permeable membranes. Generally, more uniform products are obtained at higher rates of production. However, many plastic film-forming materials are not adaptable to be melt extruded because of decomposition and other degrading effects. The present invention makes it possible to provide melt fabricated membranes which are nonthrombogenic and, when required, to render them in addition highly permeable.

Ordinarily, the polymeric plastic materials that are treated are in the desired membrane shape before commencing the operation of heparinizing the surface of the article. For example, the plastic may be in the shape of a flat membrane tube, or fine filamentary hollow fibers. However, granules, powders or other shapes from which membranes may be ultimately cast or extruded may also be treated. In this latter instance, it is essential that the nothrombogenic nature of the heparinized material is not degraded or destroyed during the transformation of the raw polymeric material into a shaped device suitable for its intended end use.

When a hydroxyl group-containing material is used as the starting material, the polymeric material is generally treated with an aqueous solution of an alkali metal hydroxide to convert the hydroxyl groups of the polymer to the oxy alkali metal substituent. In this step it is important not to choose an alkali metal hydroxide that will degrade the polymer structure to the extent of rendering it inefficient or useless for the membrane for which it is intended, e.g., as a permeable membrane. Additionally, the concentration of the alkali metal hydroxide should be such that it does not induce any deteriorating effects on the polmer itself. Advantageously, such alkali metal hydroxides or bases are sodium hydroxide, potassium hydroxide and lithium hydroxide. Ordinarily, the treatment of the polymeric material with the alkali metal hydroxide is carried out at temperatures between about 0 and 25° C. over a period from about 5 to 60 minutes. Preferably, the treatment is carried out at temperatures from about 0 to 10° C. Over a period from about 20 to 40 minutes. The concentration of the aqueous alkali metal hydroxide solution is usually from about 10 to 45% and advantageously from about 15 to 30% by weight of the hydroxide. The equivalent ratio of the alkali metal base to the hydroxyl groups in the polymer beneficially is at least about 0.8:1 and preferably from about 1:1 to about 1.3:1.

Following this first step of converting the hydroxyl groups in the polymer to oxy alkali metal groups, the polymer is then reacted with a haloalkyldialkylamine such as one represented by the structural formula:

wherein X is a halogen and R, R' and R" are alkyl radicals and the sum of the carbon atoms in R, R' and R" is from 3 to about 10. This treatment will convert the oxy alkali metal groups of the polymer to ether groups having a structural formula according to the following:

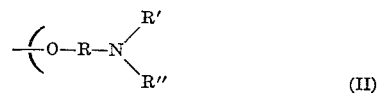

wherein R, R' and R" are as in Formula I.

Typical of the haloalkyl dialkyl amines that are employed in the etherification step are 2-chloroethyldiethylamine hydrochloride, and other terminal haloalkyl dialkyl amines having a total of from about 3 to 10 carbon atoms such as $$ClCH_2CH_2N(CH_3)_2$$
$$ClCH_2CH_2CH_2N(CH_3)_2$$
$$ClCH_2CH_2N(CH_2CH_3)_2$$

and their bromo-, fluoro- and iodo- analogs, such as

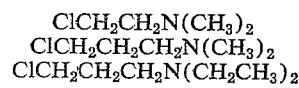

etc.

During this reaction the alkali metal of the oxy groups combines with the halogen of the haloalkyl dialkyl amine and an alkali metal halide salt is eliminated. For example, if the alkali metal of the alkali metal oxide group is sodium and the halogen of the haloalkyl dialkyl amine is chlorine, then sodium chloride would be the salt eliminated from the second step of the heparinizing treatment.

During this conversion or etherification of the oxy alkali metal group of the polymer, generally temperatures between about 25 to 100° C. and preferably from about 60 to 80° C. are employed. The use of higher temperatures will usually require lower contact times and generally the etherification can be completed in a period of time from about 15 to 120 minutes and advantageously from about 30 to 60 minutes. Generally the mole ratio of the haloalkyl dialkyl amine utilized per oxy alkali metal group in the polymer will range from about 0.4:1 to about 2:1 and preferably from 1:1 to about 1.25:1. After the etherification is completed to the extent required, the membrane is generally thoroughly washed with, preferably, deionized water.

The quaternizing of the polymer is accomplished by reacting the etherified polymer with an alkyl halide such as methyl bromide, methyl chloride, methyl iodide, ethyl bromide, etc. Others that may be employed include straight and branch chained primary alkyl, alkenyl, cycloalkyl alkyl, and aralkyl chlorides, bromides and iodides having from 1 to about 10 carbon atoms in the molecule. For the quaternizing treatment the polymeric material is usually immersed in a solution of the alkyl halide. The solvent for the alkyl halide may be frequently a solvent for the polymer, and in such cases, the concentration must be controlled so as not to dissolve the polymer. Advantageously, aqueous solutions of nonpolymer-dissolving concentrations are employed such as aqueous solutions of dimethylformamide, dimethylacetamide, dimethylsulfoxide, N-methyl pyrrolidone, tetramethylene sulfone and ring substituted derivatives thereof, etc.

Ordinarily the quaternizing is carried out at a temperature between about 0° and 50° C. and preferably between about 25° to 35° C. The time permitted for the quaternizing is generally from about 0.5 to 10 hours and usually about 2 to 4 hours is utilized for the reaction. The amount of alkyl halide employed will depend to an extent on the number of tertiary amine groups in the polymer. A mole ratio of from about 0.4:1 to 2:1 and preferably from about 1:1 to 1.25:1 moles of alkyl halide:moles tertiary amine group is utilized for the reaction in most instances.

Following the quaternizing step the treated membranes are usually thoroughly washed with deionized water. The heparinizing step is generally then carried out by washing or soaking the membranes in an aqueous heparin solution and usually sodium heparin is utilized. In addition to heparin other heparin or heparinoid materials which have the ability to prevent blood clotting may also be employed such as chondroitin sulfate and the like anticoagulants. In place of sodium heparin, other alkali metal heparins may be used. Sodium heparin is the most plentiful and readily available of the alkali metal heparins, as well as the most effective.

Dilute aqueous solutions of the alkali metal heparinoid compounds are generally employed for the haparinizing, these ranging on the order of from about 0.01 to 2 weight percent solutions. Usually an excess over the stoichiometric quantity required to react with the quaternary groups is employed. Temperatures in the range of 0° to 75° and preferably in the neighborhood of 25° C. are utilized for the reaction.

As has been discussed before, if a polymeric material is employed which does not have readily accessible hydroxyl groups, such as the cellulose esters, then it is within the scope of the present invention to first treat these materials so as to render them hydroxyl group-containing. In the instance of cellulose esters such as cellulose triacetate, these can first be deacetylated by treating with an alkali metal hydroxide such as sodium hydroxide. However, if a permeable membrane is desired, it is an important feature of the present invention when such deacetylation is carried out as well as any of the subsequent treatments leading to heparinizing, the necessary permeability properties that may be required are either maintained or induced into the membrane and maintained throughout the treatment so that once the membrane is put into use, it will be readily permeable to thise ingredients which are to pass through the membrane.

With cellulose triacetate, for example, if permeability is not an essential feature, it can be treated directly with, for instance, an aqueous sodium hydroxide solution to deacetylate the polymer and convert the ester group to a hydroxyl group. In the practice of the invention, however, it has been found to be extremely desirable in the interest of obtaining and maintaining excellent permeability properties, to swell the polymer with selected swelling agents, and while the polymer is immersed in this solution of swelling agent the deacetylation is carried out. For example with cellulose triacetate, this can be simultaneously swelled and deacetylated by treating with an aqueous solution of sodium hydroxide and a swelling agent such as tetramethylene sulfone. Such treatment has been found to be particularly useful when treating melt spun membranes or use as permeable membranes such as or artifical kidneys.

Melt spinning has been found to be one of the more advantageous ways of making hollow fibers membranes since hollow fibers having excellent uniformity and fineness in size and freedom from pinholes and other imperfections can be readily achieved at high production rates. Cellulose esters, e.g., acetates, however, are susceptible to degradation when subjected to temperatures required for melt spinning. Therefore, it has been found to be convenient to add plasticizing materials to the cellulose acetates prior to spinning which requires lower spinning temperatures. When hollow fibers are thus prepared it has been found that they are permeable to water but less so regards salt, urea and like materials which is not in keeping with the requirements of artificial kidneys. Frequently they must be additionally treated to improve the permeation properties and one particular method is disclosed and described in the copending applications of W. Eugene Skiens having Ser. Nos. 591,961 and 591,992, both filed on Nov. 4, 1966. Thus, one means for obtaining a highly permeable membrane of a cellulose acetate is to melt spin a mass of the cellulose acetate plasticized with a suitable plasticizer, such as tetramethylene sulfone and related ring-substituted derivatives combined with a polyol. Another means is to melt extrude a plasticized cellulose acetate and afterwards soak the extruded membrane in an aqueous solution of a swelling agent such as tetramethylene sulfone and certain ring-substituted derivatives.

During the deacetylation of, for example, a cellulose acetate, ordinarily temperature ranging from 0 to 100° C. and preferably from about 40 to 60° C. are utilized over a period of time, depending upon the temperature employed, of from about 1 to 8 hours and beneficially from about 3 to 4 hours. The concentration of the sodium hydroxide or other alkali metal base ordinarily will range from about 1 to 5% and preferably from about 1 to 2% by weight. The amount of the alkali metal base employed will depend upon the acetyl group content (or other ester group) and ordinarily the equivalent amount of base to ester group will range from about 0.5:1 to 2:1 and preferably from 1:1 to 1.5:1. The amount of plasticizing or swelling ingredient, e.g., tetramethylene sulfone, in the aqueous solution will ordinarily range from about 20 to 40% and preferably from 25 to 35% by volume.

Once the conversion of the ester groups to hydroxyl groups has been completed, then the heparinizing treatment can be carried out following the sequence of steps and reactions set out above in connection with the treating of hydroxyl group-containing polymeric structures.

The following examples will serve to further exemplify the present invention.

EXAMPLE 1

Ten portions of approximately 1-mil thick cellophane (regenerated cellulose) film weighing a total of 2.4 g. (0.015 mole equivalent based on the anhydroglucopyranose ring) was mercerized for 30 minutes at 0° C. with 0.6 g. (0.015 mole) NaOH dissolved in 6 ml. water.

Following mercerization, a solution of 2.58 g. (0.015 mole) of 2-chloroethyldiethylamine hydrochloride in 24 ml. water was added, followed by a further 0.6 g. of NaOH dissolved in 6 ml. water. The reaction mixture was heated on a steam bath to 75° C. for 40 minutes. The films were then washed in deionized water and let stand in fresh deionized water overnight.

The following day, the films were immersed at 25° C. for three hours in a mixture of 25 ml. each of dimethyl formamide and water in which approximately 3.0 g. of CH₃Br had been dissolved. The films were then washed in deionized water, followed by three washes in fresh 0.1% aqueous sodium heparin solution, followed by one wash in 0.9% aqueous NaCl.

The films were let standing a 0.06% aqueous sodium heparin solution containing excess heparin.

A sample of the film taken before the heparin wash and partially dehydrated showed the following elemental analysis:

|   | ≈$C_{44}H_{77}BrNO_{35}$ (percent) | |
|---|---|---|
|   | Found (GW 12629) | Atomic ratio |
| C | 41.4 | 43.8 |
| H | 6.1 | 77.0 |
| Br | 7.4 | 1.18 |
| N | 1.1 | 1.0 |
| O | 44.0 (by diff.) | 35.0 |

This analysis corresponds to the introduction of 1 alkonium group per 6 anhydroglucopyranose groups.

Samples of these heparinized membranes were thoroughly rinsed with physiologic saline and placed over the concave surface of a watch glass 16 mm. in diameter with a central depression of 7 mm. One ml. of venous blood from a human being was placed on each membrane-watch glass preparation. The preparation was then tilted at various intervals and observed for evidence of coagulation. In addition, a 20 gauge steel needle was stroked across the surface of the blood and the time recorded when a fibrous strand was noted to be adherent to the needle as it left the blood.

For a control a plain watch glass as described above was employed without any of the heparinized regenerated cellulose film. The observations were as follows:

Watch glass control (minutes lapsed)

2—Coagulation evident at edge glass interface.
10—Definite layer of fibrin on watch glass base.
13—Fibrin layer continues to thicken; no fibrin with steel needle streaking.
16—Fibrin strands adherent to steel needle.
48—Clot very solid; watch glass can be inverted.

Heparinized regenerated cellulose (minutes lapsed)

0—The blood has spread out over the film which appears to be slightly hydrophilic.
23—No evidence of coagulation.
40—First sign of fibrin (approximately 40 minutes delay of clotting).
43—Fine fibrin strands adherent to steel needle.
63—Jellylike clot has formed.

EXAMPLE 2

A nylon membrane is reacted with ethylene oxide to produce a membrane containing 55% combined ethylene oxide. This membrane is heparinized and placed on a watch glass to which is added human blood and observed according to the general procedure described in the foregoing Example 1. The inhibition of blood clotting is significantly improved over that of the corresponding membrane without the heparinization treatment.

EXAMPLE 3

A bundle of 100 10-inch long hollow fibers of cellulose triacetate are melt spun from cellulose triacetate plasticized with tetramethylene sulfone following the general procedure disclosed and described in copending application Ser. No. 393,903 filed Sept. 2, 1964. These fibers have an outside diameter of 310 microns and an inside diameter of 275 microns. The bundle of fibers are then simultaneously swelled and acetylated by a 4-hour treatment at 50° C. with a 25% excess over the stoichiometric deacetylation requirement of 1% NaOH solution in 30/70 by volume tetramethylene sulfone/water. The resulting swollen cellulose fibers are then washed with deionized water and converted to the sodium form, to the amino ether, quaternized and heparinized in turn following the general procedure described in the foregoing Example 1. The heparinized fibers are then tested for their ability to inhibit blood clotting in a manner similar to the described in the foregoing Example 1. Blood clotting is not observed when in contact with these fibers at the end of one hour.

Additionally, these fibers are found to have excellent permeability properties including high water permeability and the ability to freely pass low molecular weight salts and urea.

Other shapes of membranes made of various polymeric materials and heparinized using other of the constituents disclosed and described within the scope of the present invention can be utilized to obtain results commensurate with the foregoing.

It is important to recognize that the increases in whole blood clotting times described in the foregoing examples are measurements made with fresh whole blood under static conditions. Even more dramatic prolongations of clotting times are observed with flowing whole blood, i.e., blood under dynamic conditions.

What is claimed is:
1. The method for inhibiting thrombogenicity in a hydroxyl group containing permeable membrane comprising
    (a) converting at least a portion of the hydroxyl groups of the membrane to oxy alkali metal groups;
    (b) reacting the membrane of (a) with a haloalkyl dialkyl amine;
    (c) reacting the membrane of (b) with an alkyl halide; and
    (d) reacting the membrane of (c) with an alkali metal salt of an anionic group-containing antithrombogenic compound.
2. The method of claim 1 wherein said hydroxyl group containing membrane is cellulose.
3. The method of claim 1 wherein said antithrombogenic compound is a heparinoid compound.
4. A permeable membrane prepared according to the method of claim 1.
5. The method for inhibiting thrombogenicity in a permeable cellulose ester membrane comprising:
    (a) treating the cellulose ester with an aqueous solution of an excess over the stoichiometric amount required to de-esterify the cellulose ester of an alkali metal hydroxide;
    (b) reacting the membrane of (a) with an alkali metal hydroxide to convert at least a portion of the hydroxyl groups to oxy alkali metal groups;
    (c) reacting the membrane of (b) with a haloalkyl dialkyl amine;
    (d) reacting the membrane of (c) with an alkyl halide; and
    (e) reacting the membrane of (d) with an alkali metal salt of an anionic group-containing antithrombogenic compound.
6. A method of claim 5 wherein said cellulose ester is a cellulose acetate.
7. The method of claim 5 wherein said antithrombogenic compound is a heparinoid compound.
8. A permeable membrane prepared according to the method of claim 5.
9. An artificial kidney comprised of a plurality of fine filamentary hollow fibers that have been treated according to claim 5.
10. The method of claim 5 wherein said aqueous solution of step (a) contains a water-soluble swelling agent for the cellulose ester.
11. The method of claim 10 wherein said swelling agent is a member selected from the group consisting of dimethyl sulfoxide, dimethylformamide, N-methylformamide, dimethylacetamide, tetramethylene sulfone and ring-substituted derivatives thereof.

12. The method for inhibiting thrombogenicity in a permeable, acetylated cellulose hollow fiber comprising
   (a) treating said fiber with an aqueous alkali metal hydroxide solution containing tetramethylene sulfone as a swelling agent for said fiber wherein said hydroxide is present in an excess over the stoichiometric amount required to de-esterify the acetylated cellulose;
   (b) reacting the fiber of (a) with an alkali metal hydroxide to convert at least a portion of the hydroxyl groups of the polymer to oxy alkali metal groups;
   (c) reacting the fiber of (b) with a haloalkyl dialkyl amine;
   (d) reacting the fiber of (c) with an alkyl halide; and
   (e) reacting the fiber of (d) with an alkali metal salt of an anionic group-containing anti-thrombogenic compound.

13. The method of claim 12 wherein said hydroxide solution contains from 20 to 40 volume percent of said sulfone and said anti-thrombogenic compound is a heparinoid compound.

14. A permeable, hollow fiber membrane prepared according to the process of claim 12.

References Cited

UNITED STATES PATENTS

| | | | |
|---|---|---|---|
| 2,623,041 | 12/1952 | Grassie | 260—231 |
| 2,623,042 | 12/1952 | Vaughan | 260—231 |
| 2,768,162 | 10/1956 | Evans | 260—231 |
| 3,228,877 | 1/1966 | Mahon | 210—22 |

OTHER REFERENCES

Gott et al.: "Techniques of Applying a Graphite-Benzalkonium-Heparin Coating to Various Plastics and Metals," from Trans. Amer. Soc. Artif. Int. Organs, vol. X, 1964, pp. 213–217.

Leininger et al.: "Nonthrombogenic Plastic Surfaces," from The Bulletin (Dow Corning Center for Aid to Medical Research), vol. 8, No. 3, July 1966, pp. 9–12, page 9 relied on.

REUBEN FRIEDMAN, *Primary Examiner.*

FRANK A. SPEAR, JR., *Assistant Examiner.*

U.S. Cl. X.R.

210—500